Feb. 21, 1928. 1,660,136
E. P. RENAUX
BRAKE
Original Filed March 14, 1923
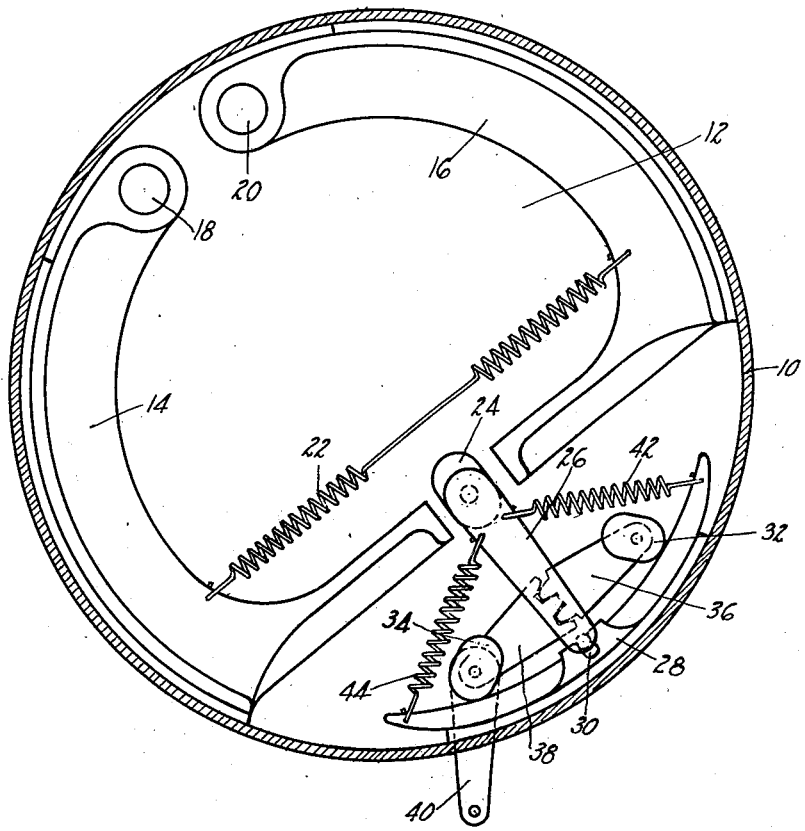
INVENTOR
EUGÈNE P. RENAUX
BY
M.W. McConkey
ATTORNEY Patented Feb. 21, 1928.

1,660,136

UNITED STATES PATENT OFFICE.

EUGÈNE PROSPER RENAUX, OF PARIS, FRANCE, ASSIGNOR TO BENDIX BRAKE COMPANY, OF CHICAGO, ILLINOIS, A CORPORATION OF ILLINOIS.

BRAKE.

Original application filed March 14, 1923, Serial No. 625.072, and in France June 8, 1922. Divided and this application filed April 13, 1926. Serial No. 101,731.

This invention relates to brakes and is illustrated as embodied in a brake for an automobile having a servo or brake-applying device which is assembled into and in effect forms a part of the brake.

An object of the invention is to arrange two or more brake shoes or other friction devices, one of which is illustrated in the form of a "servo" or "relay" brake shoe, sometimes referred to as a "booster" shoe, in such a manner that the servo device operates through power-multiplying connections such as a lever and cam to operate the other friction device. In one desirable arrangement the friction devices are in the form of two shoes arranged end to end, one of the shoes being anchored and the other being a floating servo shoe forced against the drum by novel driver-operated means and frictionally urged by the drum in a direction to operate the lever and cam or other power-multiplying means. A specific driver-operated means for applying the servo shoe which is illustrated in the drawing also embodies substantial novelty in the use of a pair of interconnected spaced applying devices shown as cams.

Another important feature of the invention relates to arranging the friction means of the brake, for example a pair of anchored brake shoes, in such a manner as to leave at one side of the drum a gap within which is arranged the servo device which forces against the drum at least one and preferably both of the shoes or their equivalents. The servo shoe preferably operates through power-multiplying means, as described above, and is illustrated in the particular embodiment of the invention shown in the drawings as rocking the cam to force the brake shoes in opposite directions against the drum.

Preferably one or a pair of the shoes, as for example one or both of the anchored shoes, have portions projecting into the sector of the drum defined by the other (i. e. in this case the servo) shoe, thus in effect causing the shoes to overlap each other. This brings the friction faces of the shoes immediately adjacent each other without interfering with the connections at the ends of the shoes,—in the illustrated arrangement, for example, without interfering with the connections from the servo shoe.

The above and other objects and features of the invention, including various novel combinations of parts and desirable particular constructions, will be apparent from the following description of one illustrative embodiment shown in the accompanying drawing, in which:

The figure is a vertical section through the brake just inside the head of the brake drum, showing the brake shoes in side elevation.

The illustrated brake includes a drum 10 having the usual peripheral cylindrical braking flange which is shown in section in the drawing and which is closed at its open end by the usual backing plate 12. Within the drum 10 is arranged the friction means of the brake, herein illustrated as a pair of arcuate and substantially rigid brake shoes 14 and 16 anchored on the backing plate at their adjacent ends by pivots 18 and 20. Shoes 14 and 16 are urged away from the drum to release the brake by a suitable tension spring 22 which connects the two shoes. The means for forcing the shoes 14 and 16 against the brake drum is shown as a double cam 24 having its spindle pivotally mounted in the backing plate 12 and which is rocked to apply the brake by a lever or arm 26, the arm 26 and cam 24 forming a power-multiplying linkage for applying the brake. For convenience of illustration, the shoes 14 and 16 are shown in the "on" position,—that is, in engagement with the drum, whereas the cam 24 is shown in the "off" position. In the practical use of the brake, when the shoes 14 and 16 are in engagement with the drum, as in the drawing, the cam 24 would be turned to an angle of approximately 45 degrees (in the illustrated arrangement) in one direction or the other from the position shown in the drawing.

The lever 26 is operated by a floating servo shoe or the like 28, sometimes referred to as a "relay" shoe or "booster" shoe. The shoe is inter-connected with the lever in any suitable manner, as for example by having a radial slot 30 embracing a pin carried by the lever. The servo shoe 28 is forced outwardly against the drum in applying the brake by novel driver-operated means shown as a pair of spaced double cams 32 and 34 inter-connected by a pair of arms 36 and 38 secured to the cams and formed with intermeshing rack or gear segments. Cam 34 is shown as having an operating arm 40 which rocks the cam and its arm 38 so that both of the cams are turned in a direction to force the servo shoe outwardly against the drum. It will be noted that the two cams 32 and 34 form applying devices which are disconnected from the servo shoe so that they permit the shoe to move angularly about the axis of the drum 10 to rock the double cam 24 to apply the brake without disturbing the positions of the cams 32 and 34.

It will be observed that shoes 14 and 16 have portions projecting into the sector of the drum defined by shoe 28, and thus in effect overlap opposite ends of shoe 28. This gives room for the operating connections behind shoe 28,—i. e. the friction face of shoe 28 in its extreme active positions is immediately adjacent the ends of the friction faces of shoes 14 and 16.

A pair of tension springs 42 and 44 are arranged to serve as return springs for the servo shoe and are connected at their opposite ends to the lever 26 and to the opposite ends of the servo shoe 28. When the brake is released these springs pull the servo shoe away from the drum as far as permitted by the slot 30 and the cams 32 and 34, while the spring 22 not only serves as a return spring for the shoes 14 and 16 but also acts on the arm 24 to center the servo shoe 28 in the gap at the lower right-hand side of the drum between the unanchored ends of the shoes 14 and 16.

While one illustrative embodiment of the invention has been described in detail, it is not my intention to limit the scope of the invention to that particular embodiment or otherwise than by the terms of the appended claims. Most of the subject-matter herein shown, and all of the subject-matter herein claimed, is divided from my prior application No. 625,072, filed March 14, 1923.

I claim:

1. A brake comprising, in combination, a drum, a pair of pivoted brake shoes engaging the drum in either direction of rotation, a servo shoe movable into frictional engagement with the drum, and members operated by circumferential movement of the servo shoe to move the brake shoes toward the drum, the brake shoes and servo shoe all engaging the same zone of the drum.

2. A brake comprising, in combination, a drum, a pair of main shoes inside the drum, a servo shoe inside the drum between the ends of the friction faces of the pivoted shoes, and members operated by circumferential movement of the servo shoe to move the main shoes outwardly against the drum in either direction of rotation of the drum.

3. A brake comprising, in combination, a drum, a brake shoe anchored at one end within the drum, a movable second shoe within the drum adjacent one end of the first shoe, means for forcing the second shoe against the drum, and a lever operated by movement of the second shoe and acting on the unanchored end of the first shoe to force it out against the drum in either direction of rotation of the drum.

4. A brake comprising, in combination, a drum, a pair of shoes within the drum, and means for forcing both shoes against the drum in either direction of drum rotation including a third shoe engaging the same zone of the drum as said pair of shoes.

5. A brake comprising, in combination, a drum, a shoe anchored at one end within the drum, an unanchored shoe adjacent the free end of the anchored shoe, a lever pivoted at one end to the unanchored shoe and rocked about its other end by movement of the unanchored shoe and arranged to force the anchored shoe against the drum in either direction of drum rotation, and means for forcing the unanchored shoe against the drum and causing it a short movement circumferentially of the drum to rock the lever.

6. A brake comprising, in combination, a drum, friction means engageable with the drum and having relatively-movable ends, a servo shoe adjacent said ends and engageable with the same zone of the drum as the friction means and arranged to force the friction means against the drum, a device engaging the servo shoe and forcing it against the drum, and spring means urging the servo shoe away from the drum.

7. A brake comprising, in combination, a drum, friction means engageable with the drum, a servo shoe engageable with the same zone of the drum as the friction means and arranged to force the friction means against the drum, and a device disconnected from the servo shoe and forcing it against the drum but unaffected in its action on the servo shoe by movement of the servo shoe with the drum.

8. A brake comprising, in combination, a drum, an expansible friction device within the drum having free ends and engageable with the inner surface of the drum flange, a servo shoe engageable with the inner surface of the drum flange and arranged adjacent the free ends of said friction device, and means operated by movement of the servo shoe for forcing at least one of the free ends of the friction device against the drum in either direction of drum rotation.

9. A brake comprising, in combination, with a drum, a pair of anchored shoes having their ends spaced apart at one side of the drum, and means for moving the shoes in opposite directions to apply the brake in either direction of drum rotation including a servo shoe arranged adjacent said spaced ends.

10. A brake comprising, in combination with a drum, a pair of anchored shoes having their ends spaced apart and engaging the drum in either direction of rotation when the brake is applied, and means for moving the shoes in opposite directions to apply the brake including a servo shoe arranged adjacent said spaced ends, and power-multiplying means operated by the servo shoe and acting on at least one of the pair of shoes.

11. A brake comprising, in combination with a drum, friction means with free ends spaced apart, and means acting on said ends to apply the brake in either direction of drum rotation including a servo shoe arranged adjacent said free ends, and power-multiplying connections operated by the servo shoe and acting on both of said ends.

12. A brake comprising, in combination with a drum, a friction device within the drum having spaced-apart free ends, means for moving the free ends toward the drum to apply the brake in either direction of drum rotation including a servo shoe adjacent the free ends, and anchoring means engaging the friction device at a part intermediate between said free ends.

13. A brake comprising, in combination, a friction device having the ends of its friction face spaced apart, a servo shoe between said ends arranged to spread them apart to apply the brake, the servo shoe having an inner bearing surface, and a disconnected part engaging the bearing surface to apply the servo shoe and over which the servo shoe moves to apply the friction device.

14. A brake comprising, in combination, a drum having a substantially cylindrical flange, a retarding device expansible and contractable for frictional engagement with the inner surface of the flange, and extending around the drum in such a manner as to leave an unobstructed space between the ends of its friction face, a servo member in said space arranged to have a limited circumferential movement with the drum, means for moving the servo member into frictional engagement with the flange of the drum, spring means urging the servo member away from the drum, and the servo member being operated by circumferential movement to bring the retarding device into frictional engagement with the drum.

15. A brake comprising, in combination, a drum having a substantially cylindrical flange, a pair of pivoted shoes movable into frictional engagement with the inner surface of the flange, and extending around the drum in such a manner as to leave an unobstructed space between the ends of their friction faces, a servo member in said space arranged to have a limited circumferential movement with the drum, and manually-controlled means for moving the servo member against the flange of the drum, spring means urging the servo member away from the drum, and the servo member being operated by circumferential movement to swing the shoes into frictional engagement with the drum.

16. A brake comprising, in combination, a drum, a plurality of shoes engageable with the drum in either direction of rotation and having movable ends, and a drum-engaging servo shoe adjacent said ends and operated to force at least one of said plurality of shoes against the drum.

17. A brake comprising, in combination, a drum, a friction device engageable with the drum and having movable ends, a drum-engaging shoe engageable with the same zone of the drum as the friction device, and power-multiplying means operated by movement of said shoe to force at least one of said ends against the drum in either direction of drum rotation.

18. A brake comprising, in combination, a drum, retarding means movable into frictional engagement therewith, and actuating mechanism for said retarding means including a driver-controlled brake shoe movable into frictional engagement with the same zone of the drum surface as engages the retarding means, together with power-multiplying means connecting the shoe and the retarding means and spring means urging the shoe away from the drum.

19. A brake comprising, in combination, a drum, a shoe anchored at one end within the drum, an auxiliary unanchored shoe engaging the same zone of the drum surface as the anchored shoe, driver-operated means for causing the auxiliary shoe to move lengthwise in applying the brake, and power-multiplying means operated by lengthwise movement of the auxiliary shoe in either direction of drum rotation and arranged to force the unanchored end of the anchored shoe outwardly against the drum.

20. A brake comprising, in combination, a drum, a friction device within the drum and extending less than the full circumference to leave a gap at one side of the drum, an angularly-movable brake shoe within said gap, means for forcing the shoe against the drum, and power-multiplying connections operated by angular movement of the shoe, whichever direction the drum is turning, to force the friction device outwardly against the drum.

21. A brake comprising, in combination, a drum, a pair of anchored shoes within the drum and extending less than the full circumference to leave a gap at one side of the drum, an angularly-movable auxiliary shoe within said gap, means for forcing the auxiliary shoe against the drum, and a connection operated by angular movement of the auxiliary shoe to force at least one of the anchored shoes outwardly against the drum.

22. A brake comprising, in combination, a drum, an expansible friction device within the drum extending less than the full circumference to leave a gap at one side of the drum, an angularly-movable shoe within said gap, and means for forcing the shoe against the drum, the shoe being operated by angular movement to force the friction device against the drum.

23. A brake comprising, in combination, a drum, a pair of anchored shoes within the drum extending less than the full circumference to leave a gap at one side of the drum, an angularly-movable auxiliary shoe within the said gap, means for forcing the auxiliary shoe against the drum, and means operated by angular movement of said auxiliary shoe to force the free ends of the anchored shoes outwardly in opposite directions against the drum.

24. A brake comprising, in combination, a drum, two brake shoes acting on the same part of the drum surface, the first shoe being angularly movable with the drum, a power-multiplying device engaging the second shoe to force it outwardly against the drum operated by angular movement of the first shoe, and means for causing movement of the first shoe to operate said device, whichever direction the drum is turning.

25. A brake comprising, in combination, a drum, two brake shoes acting on the same zone of the drum surface, the first shoe being angularly movable with the drum, a cam engaging the second shoe to force it outwardly against the drum, and a connection operated by angular movement of the first shoe to rock said cam.

26. A brake comprising, in combination, a drum, a pair of anchored shoes within the drum, an auxiliary movable shoe engageable with the same zone of the drum surface as the anchored shoes and means operated by movement of the auxiliary shoe in either direction of drum rotation to force at least one of the anchored shoes against the drum.

27. A brake comprising, in combination, a drum, a pair of anchored shoes within the drum, an auxiliary shoe engageable with the same zone of the drum surface as the anchored shoes and which is angularly movable with the drum, and means operated by angular movement of the auxiliary shoe with the drum in either direction to force the anchored shoes apart against the drum.

28. In brake mechanism of the kind referred to, main and servo shoes arranged end to end, and a multiplying lever mechanism between the main and servo shoes.

29. A brake having main and servo shoes arranged end to end, a pivoted cam engaging the main shoe, and means operated by the servo shoe for turning the cam.

30. The combination with a stationary part and a rotatable member having a drum with a cylindrical surface thereon, of a non-continuous friction member positioned within said cylindrical surface, a second friction member positioned within said cylindrical surface and between the ends of the first-mentioned friction member, a cam, and means connected therewith for causing said second friction member to engage said cylindrical surface, the engagement of said second friction member with said cylindrical surface causing the first-mentioned friction member to engage said cylindrical surface.

31. In brake mechanism, the combination of a brake drum, a plurality of brake shoes co-operating with the interior thereof, a relatively fixed anchorage for one of said shoes, a movable arm arranged to swing about a relatively fixed fulcrum and to which the other of said shoes is connected, means for actuating the last-mentioned shoe to engage it with said drum, and means operatively-connecting the first-mentioned shoe and said arm whereby the first mentioned shoe is caused to engage said drum by the movement of the arm.

32. In brake mechanism, the combination of a brake drum, a plurality of brake shoes arranged end to end and engageable with the drum, torque-taking means anchoring one of the shoes, a brake-applying device acting on the other shoe, and power-multiplying means connecting the shoes and through which said other shoe acts to apply the anchored shoe.

33. A brake comprising, in combination, friction means, a servo shoe arranged to apply the friction means, and a pair of interconnected spaced applying devices engaging the servo shoe.

34. A brake comprising, in combination, a drum, friction means engageable with the drum, a servo shoe engageable with the same zone of the surface of the drum as the friction means, and a plurality of spaced interconnected applying devices for forcing the servo shoe against the drum.

35. A brake comprising at least three arcuate shoes arranged end to end and forming approximately a circle, at least one shoe having a portion projecting a substantial distance into the sector of the circle defined by an adjacent shoe, in combination with means through which one shoe acts to apply at least one of the other shoes.

36. A brake comprising, in combination, a drum, a pair of brake shoes within the drum and one of which shoes has a portion projecting a substantial distance into the sector of the drum defined by the other shoe, one shoe being anchored and the other unanchored, and means for forcing the unanchored shoe against the drum, the unanchored shoe being movable to force the anchored shoe against the drum.

37. A brake comprising at least three arcuate brake shoes arranged end to end in a circle, and one of which is operatively connected to at least one of the others, and two of which have portions projecting substantial distances into the sector of the circle defined by the third.

38. A brake comprising at least three arcuate brake shoes arranged end to end in a circle, and one of which is operatively connected to both of the others, and two of which shoes have portions projecting substantial distances into the sector of the circle defined by the third shoe.

39. A brake comprising a plurality of arcuate brake shoes, at least two of which have portions extending substantial distances into the same sector, and one of which is anchored and is operated by a different shoe.

40. A brake comprising a plurality of arcuate brake shoes, at least two of which have portions extending substantial distances into the same sector, and at least two of which are anchored and at least one of which anchored shoes is operated by a different shoe.

41. A brake comprising, in combination, a drum, a friction device within the drum having the ends of its drum-engaging friction face a substantial distance apart to leave a sector therebetween and which has at said ends portions projecting into said sector, and a shoe in said sector and engageable with the drum outside of said portions, and which is arranged to force the friction device against the drum.

42. A brake comprising, in combination, a drum, a pair of arcuate shoes pivoted at their adjacent ends within the drum and having their friction faces spaced a considerable distance apart at the other ends of the shoes, to leave a sector therebetween in which the drum is unobstructed by said shoes, the shoes having portions projecting toward each other across said sector, and a third shoe arranged between said portions and the drum, in said sector.

In testimony whereof, I have hereunto signed my name.

EUGÈNE PROSPER RENAUX.